(12) United States Patent
Alexander et al.

(10) Patent No.: US 8,258,845 B1
(45) Date of Patent: Sep. 4, 2012

(54) CLOCK AUTO-PHASING FOR REDUCED JITTER

(75) Inventors: Mark A. Alexander, San Francisco, CA (US); Sean A. Koontz, Hollister, CA (US)

(73) Assignee: Xilinx, Inc., San Jose, CA (US)

( * ) Notice: Subject to any disclaimer, the term of this patent is extended or adjusted under 35 U.S.C. 154(b) by 1273 days.

(21) Appl. No.: 11/134,117

(22) Filed: May 20, 2005

(51) Int. Cl.
 *H03K 3/00* (2006.01)
(52) U.S. Cl. ...................................................... 327/291
(58) Field of Classification Search ............... 327/3, 12, 327/158, 231, 233, 237, 291
 See application file for complete search history.

(56) References Cited

U.S. PATENT DOCUMENTS

| | | | | |
|---|---|---|---|---|
| 4,785,251 A | * | 11/1988 | Akiyama et al. | 327/7 |
| 6,259,288 B1 | * | 7/2001 | Nishimura | 327/156 |
| 2004/0145397 A1 | * | 7/2004 | Lutkemeyer | 327/158 |

* cited by examiner

*Primary Examiner* — Lincoln Donovan
*Assistant Examiner* — Khareem E Almo
(74) *Attorney, Agent, or Firm* — William L. Paradise, III; John J. King

(57) ABSTRACT

The relative timing of triggering switching events in a circuit block of an IC device is dynamically adjusted in response to fluctuations in device's supply voltage to minimize clock jitter caused by supply voltage noise. A control circuit monitors supply voltage fluctuations, and in response thereto dynamically phase-shifts a clock signal that triggers the switching events so that the switching events occur during relatively quiet time intervals in which fluctuations in the supply voltage are minimal.

19 Claims, 8 Drawing Sheets

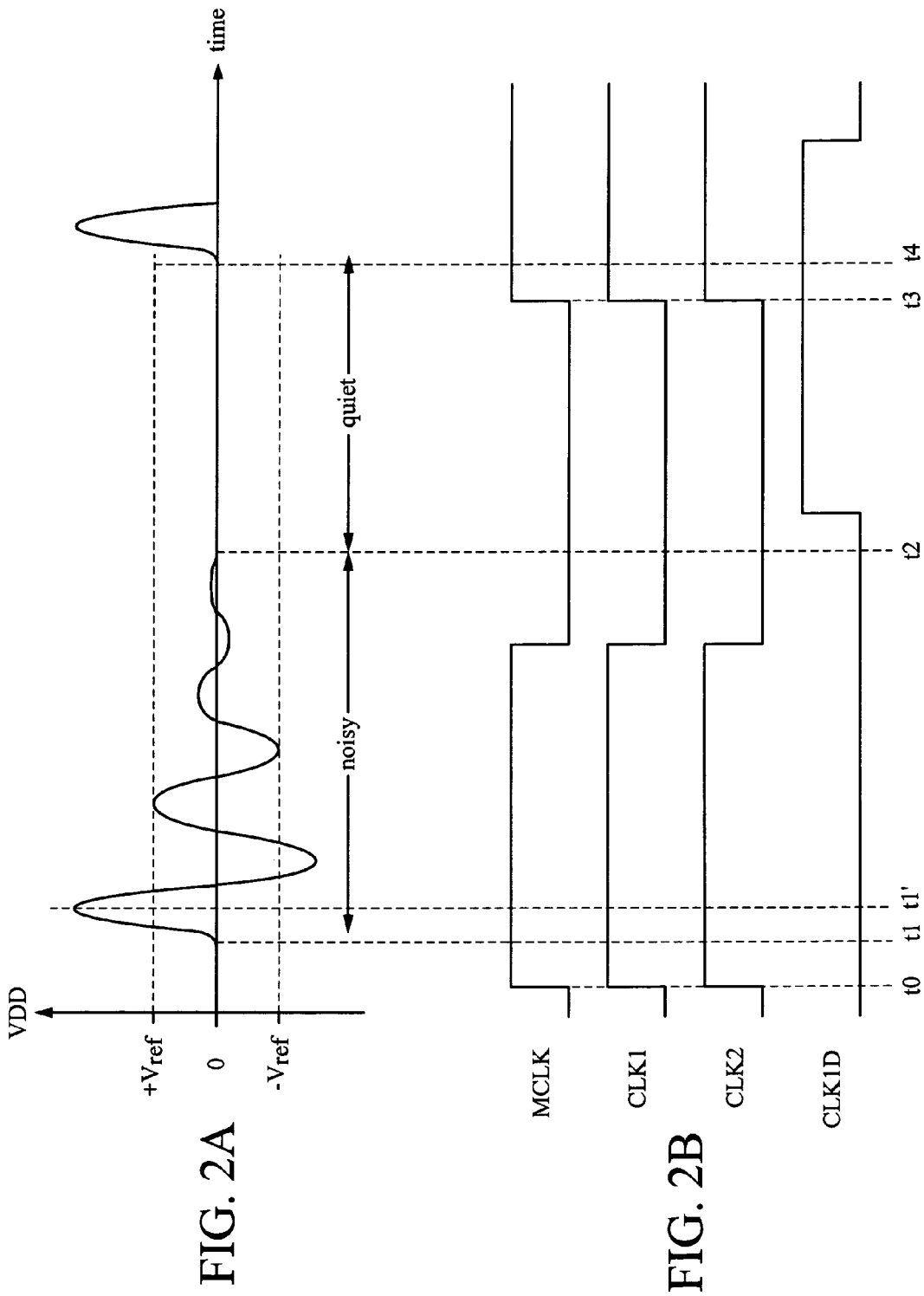

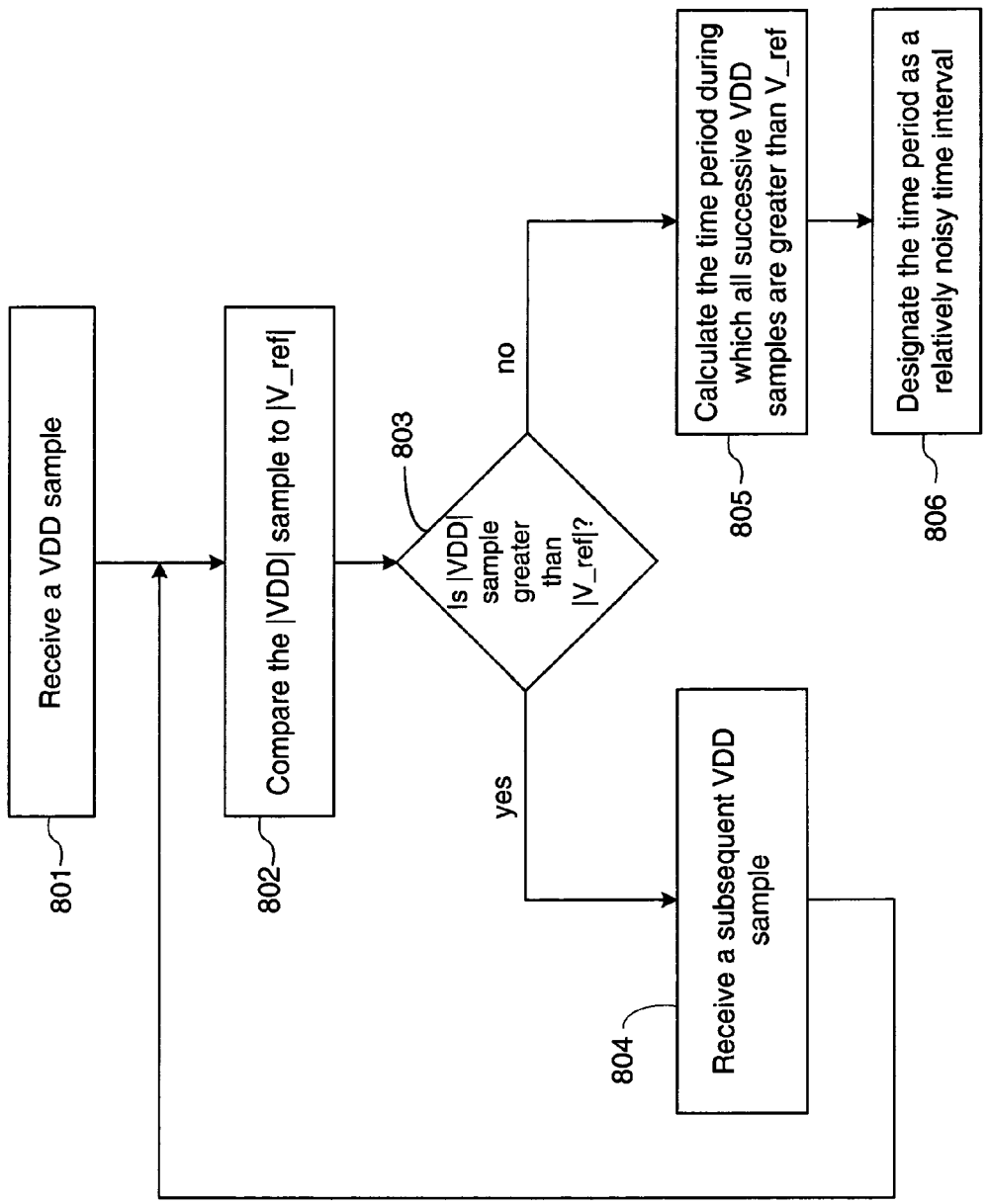

CLOCK AUTO-PHASING FOR REDUCED JITTER

FIELD OF INVENTION

This invention relates generally to power supply noise in integrated circuit (IC) devices, and in particular to reducing clock jitter resulting from power supply noise.

DESCRIPTION OF RELATED ART

Digital IC devices typically employ a global or system clock signal to synchronize various synchronous circuit elements with each other. The system clock signal is typically distributed across an IC device via one or more global clock lines, and is often used to generate a number of local clock signals for clocking synchronous circuit elements in corresponding circuit blocks formed within the device. As known in the art, undesirable fluctuations in the device's power supply (e.g., caused by switching noise, ground bounce, and the like) may create clock jitter in one or more of the device's circuit blocks, which in turn may not only degrade device performance but may also result in device malfunction.

For example, switching events such as logic state transitions of signals in CMOS circuits typically generate transient currents that may cause undesirable fluctuations in the device's supply voltage. These undesirable supply voltage fluctuations may alter the timing characteristics of switching events in one or more of the device's circuit blocks, which in turn may result in timing errors. More specifically, because a circuit's threshold voltage defines the specific voltage level (and thus the relative timing) at which logic state transitions are detected by the circuit, variations in the circuit's threshold voltage resulting from supply voltage fluctuations may alter the temporal relationship between switching events in various circuit blocks of the device.

For many IC devices, a significant portion of the supply voltage noise may be caused by switching events in a relatively small number of the device's circuit blocks. As known in the art, the magnitude of supply voltage fluctuations caused by switching events in a circuit block is proportional to the magnitude of the transient currents generated during such switching events. Thus, if a number of first circuit blocks generate relatively small transient currents during switching events and a number of second circuit blocks generate relatively large transient currents during switching events, switching events in the second circuit blocks may cause supply voltage fluctuations that result in clock jitter in the first circuit blocks.

To minimize clock jitter in a first circuit block (e.g., having a core logic clock) resulting from supply voltage fluctuations caused by switching events in a second circuit block (e.g., having large I/O drivers), some devices include a static delay element that delays the triggering of switching events in the first or second circuit blocks by a predetermined time period so that switching events in the first circuit block do not coincide with supply voltage fluctuations caused by switching events in the second circuit block. Typically, the static delay element is configured to maintain a predetermined phase delay between corresponding clock signals that trigger switching events in the first and second circuit blocks.

Unfortunately, the static delay element is unable to compensate for process variations inherent in the fabrication of semiconductor devices and/or for unpredictable variations in operating conditions such as, for example, operating temperature variations. Further, the static nature of prior techniques is relatively ineffective for minimizing clock jitter in user-configurable IC devices such as programmable logic devices (PLDs). For example, because a PLD is usually configured by a user to implement a specific circuit design, the PLD manufacturer is typically unaware of the temporal relationship between switching events in the various PLD resources that will be utilized to implement the user's design. Further, because each user design may configure the PLD's resources differently, the temporal relationship between switching events in the PLD's resources typically differs between various user designs. As a result, employing a static delay element in a user-configurable device such as a PLD to minimize clock jitter typically produces unpredictable results.

Therefore, there is a need for a technique for dynamically adjusting the triggering of switching events in one or more selected circuit blocks of an IC device in response to fluctuations in the device's supply voltage to minimize clock jitter in the selected circuit blocks.

SUMMARY

A method and apparatus are disclosed that dynamically adjust the triggering of switching events in one or more selected circuit blocks of an IC device in response to fluctuations in the device's supply voltage to minimize clock jitter in the selected circuit blocks caused by such supply voltage fluctuations. In accordance with an embodiment of the present invention, an IC device includes a power distribution system, any number of circuit blocks powered by the power distribution system, and a control circuit. The power distribution system distributes a supply voltage (VDD) across the device. A first of the circuit blocks may include any number of well-known circuit elements having switching events that are triggered by a first clock signal. The control circuit monitors fluctuations in VDD, and in response thereto dynamically phase-shifts the first clock signal (e.g., relative to other clock signals in the device) so that the switching events in the first circuit block occur during relatively quiet time intervals in which fluctuations in VDD are minimal.

For some embodiments, the control circuit includes a detection circuit and an adjustable delay circuit. The detection circuit identifies the relatively quiet time intervals in the VDD waveform, and in response thereto generates a delay signal indicative of the phase relationship between a triggering edge of the first clock signal and a selected instance in a corresponding relatively quiet time interval of the VDD waveform. The adjustable delay circuit dynamically delays the first clock signal in response to the delay signal to generate a phase-delayed clock signal that triggers switching events in the first circuit block during the relatively quiet time intervals of the VDD waveform.

For other embodiments, the control circuit includes a detection circuit and either a delay-locked loop (DLL) circuit, a phase-locked loop (PLL) circuit, a combination thereof, or any other means of producing a precisely calibrated delay. The detection circuit identifies the relatively quiet time intervals in the VDD waveform, and in response thereto generates a feedback clock signal having triggering edges that are in-phase with selected instances in corresponding relatively quiet time intervals of the VDD waveform. The DLL/PLL circuit dynamically phase-shifts the first clock signal until it is in-phase with the feedback clock signal so that switching events in the first circuit block are triggered during the relatively quiet time intervals of the VDD waveform.

By dynamically phase-shifting the triggering of switching events in the first circuit block in response to fluctuations in the device's supply voltage, embodiments of the present invention may more effectively reduce clock jitter resulting from power supply fluctuations than prior techniques that employ a static delay element. Embodiments of the present invention are particularly applicable to user-configurable devices such as PLDs for which the temporal relationship between switching events in the device's various circuit blocks are unknown when the device is fabricated and/or when the device is delivered to a customer. Further, because of the control circuit's dynamic nature, embodiments of the present invention may compensate for process variations inherent in the fabrication of semiconductor devices and/or for variations in operating temperature.

BRIEF DESCRIPTION OF THE DRAWINGS

The features and advantages of the present invention are illustrated by way of example and are by no means intended to limit the scope of the present invention to the particular embodiments shown, and in which:

FIG. 2A is an exemplary waveform diagram depicting fluctuations in the supply voltage of the device of FIG. 1;

FIG. 2B is a timing diagram depicting various clock signals for an exemplary operation of one embodiment of the device of FIG. 1;

FIG. 8 is a flow diagram depicting an exemplary operation of some embodiments for identifying a relatively noisy time interval of the supply voltage waveform associated with the device of FIG. 1.

Like reference numerals refer to corresponding parts throughout the drawing figures.

DETAILED DESCRIPTION

Embodiments of the present invention are described below in the context of an exemplary IC device 100 for simplicity only. It is to be understood that present embodiments are equally applicable to other IC devices including, for example, programmable logic devices (PLDs) such as Field Programmable Gate Arrays (FPGAs) and/or complex PLDs, application-specific integrated circuit (ASIC) devices, microprocessors, and other suitable semiconductor devices. In the following description, for purposes of explanation, specific nomenclature is set forth to provide a thorough understanding of the present invention. In other instances, well-known circuits and devices are shown in block diagram form to avoid obscuring the present invention unnecessarily. Further, although present embodiments are described below as being responsive to the rising edges of various clock signals, other embodiments may be responsive to either the falling edges or to both the rising and falling edges of the various clock signals. Accordingly, the present invention is not to be construed as limited to specific examples described herein but rather includes within its scope all embodiments defined by the appended claims.

Figure 1A:
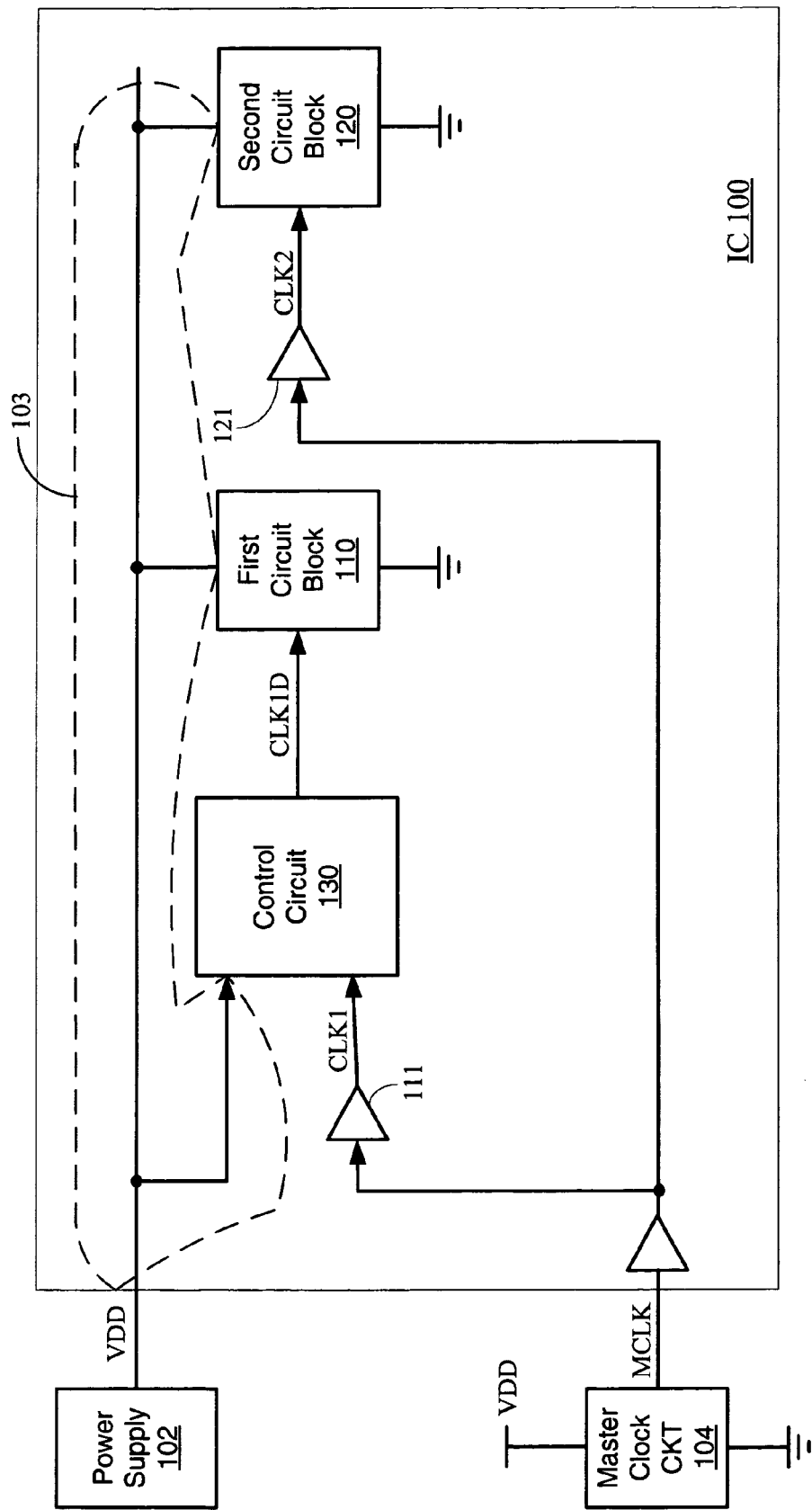
FIGS. 1A and 1B, are simplified block diagrams of an exemplary IC device including a control circuit configured in accordance with some embodiments of the present invention to minimize clock jitter caused by fluctuations in the device's supply voltage.

FIG. 1A shows a simplified block diagram of an exemplary IC device 100 within which embodiments of the present invention may be implemented. Device 100, which may be any suitable semiconductor device such as, for example, a PLD or an ASIC device, includes a power supply 102, a master clock circuit 104, first and second circuit blocks 110 and 120, first and second local clock circuits 111 and 121, and a control circuit 130. Power supply 102, which is well-known, distributes a supply voltage VDD throughout device 100 via a power distribution system, a portion which is shown within the dotted line 103. Master clock circuit 104, which has power connections to VDD and to ground potential, may be any well-known circuit. First local clock circuit 111 includes an input to receive MCLK and includes an output to provide a first local clock signal CLK1 that may be used to trigger switching events in first circuit block 110. Second local clock circuit 121 includes an input to receive MCLK and includes an output to provide a second local clock signal CLK2 that may be used to trigger switching events in second circuit block 120.

For simplicity, device 100 is shown in FIG. 1 as including only two circuit blocks 110 and 120. However, for actual embodiments, device 100 may include any number of circuit blocks and/or any number of associated clock circuits to generate corresponding local clock signals. For one embodiment, second circuit block 120 and its corresponding clock circuit 121 may be eliminated. Further, other well-known elements of device 100 are not shown in FIG. 1 for simplicity.

Local clock circuits 111 and 121 may be any well-known circuits that generate CLK1 and CLK2, respectively, in response to MCLK. For some embodiments, clock circuits 111 and 121 may be similarly configured such that CLK1 and CLK2 are in-phase with each other and/or with MCLK. For other embodiments, clock circuits 111 and 121 may be differently configured such that CLK1 and CLK2 are out-of-phase with respect to each other. For another embodiment, clock circuits 111 and 121 may be eliminated.

First and second circuit blocks 110 and 120, which have power connections to VDD and to ground potential, may each include any number of well-known circuit elements such as latches, flip-flops, logic circuits, memory elements, processors, and the like. For exemplary purposes of discussion herein, switching events in first circuit block 110 are particularly susceptible to clock jitter resulting from fluctuations in VDD caused by switching events in second circuit block 120, and therefore exemplary embodiments are described below with respect to minimizing clock jitter in first circuit block 110 caused by switching events in second circuit block 120. For example, for some embodiments of device 100, first circuit block 110 may include circuit elements such as synchronous logic elements, processors, and other circuit elements that require precise timing of clock and data signals for proper operation, and second circuit block 120 may include circuit elements such as I/O drivers that generate relatively large transient currents during switching events, e.g., as compared to transient currents generated during switching events in first circuit block 110. The relatively large transient currents generated during switching events in second circuit block 120 may cause fluctuations in VDD that result in an unacceptable amount of clock jitter for first circuit block 110.

However, embodiments of the present invention may be used to minimize clock jitter for first circuit block 110 resulting from synchronous fluctuations in VDD caused by sources other than switching events in second circuit block 120, for example, such as external noise and/or interference. Accordingly, embodiments of the present invention may be used to reduce clock jitter for first circuit block 110 resulting from fluctuations in VDD, irrespective of the cause of such fluctuations, as long as they are synchronous.

Control circuit 130 includes a first input coupled to power distribution system 103, a second input to receive CLK1 from first local clock circuit 111, and an output coupled to a clock input of first circuit block 110. Control circuit 130 monitors the voltage level of power distribution system 103 to identify relatively quiet time intervals in the VDD waveform during which fluctuations in VDD are minimal, and in response thereto dynamically phase-shifts CLK1 to generate a phase-delayed clock signal CLK1D that triggers switching events in first circuit block 110 during the relatively quiet time intervals. In this manner, control circuit 130 may reduce clock jitter associated with first circuit block 110 caused by undesirable fluctuations in VDD.

Although not shown in FIG. 1A for simplicity, control circuit 130 includes power connections to VDD and to ground potential. In addition, for purposes of discussion below with respect to FIGS. 2A, 2B, and 3, the control circuit 130 of device 100 is shown in FIG. 1A as being coupled only to first circuit block 110. However, for other embodiments, control circuit 130 may also be coupled to second circuit block 120 and configured to dynamically phase-shift the triggering of switching events in second circuit block 120 in response to fluctuations in VDD. For still other embodiments, first and second circuit blocks 110 and 120 may be coupled to separate control circuits 130.

Figure 1B:
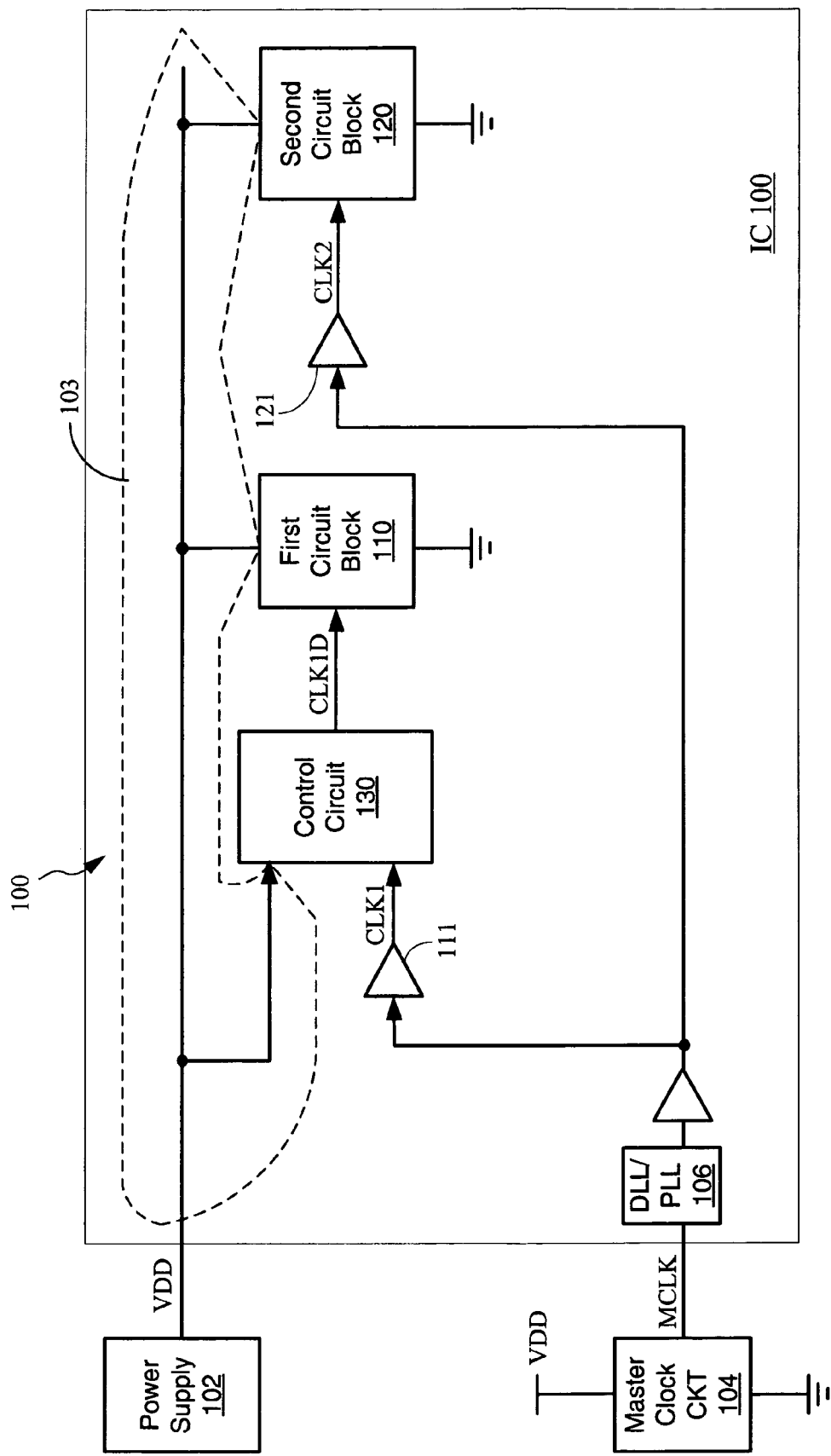

FIG. 1B is another simplified block diagram of an exemplary IC device similar to FIG. 1A. The major difference is that MCLK is input into a PLL or DLL or combination thereof 106 on IC 100. The DLL/PLL 106 then send the clock signal to buffers 111 and 121.

An exemplary operation of control circuit 130 for reducing clock jitter associated with first circuit block 110 resulting from fluctuations in VDD caused by switching events in second circuit block 120 is described below with respect to FIGS. 2A, 2B, and 3. For the exemplary operation discussed below, switching events in first circuit block 110 are triggered by rising edges of CLK1D, and switching events in second circuit block 120 are triggered by rising edges of CLK2. For other embodiments, first circuit block 110 may be responsive to falling edges of CLK1D, and second circuit block 120 may be responsive to falling edges of CLK2. Alternatively, for another embodiment, first circuit block 110 may be responsive to both rising and falling edges of CLK1D, and second circuit block 120 may be responsive to both rising and falling edges of CLK2.

Referring first to the illustrative timing diagram of FIG. 2B, at time t0, master clock signal MCLK transitions from logic low to logic high, which causes clock signals CLK1 and CLK2 to transition from logic low to logic high via local clock circuits 111 and 121, respectively. For simplicity, the gate delays associated with local clock circuits 111 and 121, as well as the signal propagation delays of CLK1 and CLK2, are not depicted in the timing diagram of FIG. 2B. The rising edge of CLK2 triggers switching events in second circuit block 120. The switching events in second circuit block 120 cause undesirable fluctuations in VDD, which are depicted as beginning at time t1 in the exemplary VDD waveform of FIG. 2A. As shown in FIG. 2A, the fluctuations in VDD are at a relatively maximum level at time t1', and gradually decrease until a relatively minimal (e.g., zero) level is reached at approximately time t2. Thereafter, at time t3, the next rising edge of CLK2 triggers subsequent switching events in second circuit block 120, thereby causing subsequent fluctuations in VDD beginning at time t4.

Thus, for the exemplary timing diagram depicted in FIG. 2B, the time period between times t1 and t2 may be characterized as a relatively "noisy" time interval during which VDD fluctuations are relatively large, and the time period between times t2 and t4 (or alternatively, t2 and t3) may be characterized as a relatively "quiet" time interval during which VDD fluctuations are relatively small or minimal. As explained below, control circuit 130 is configured to trigger switching events in first circuit block 110 during the relatively quiet time intervals in the VDD waveform to reduce clock jitter associated with first circuit block 110.

Figure 3:
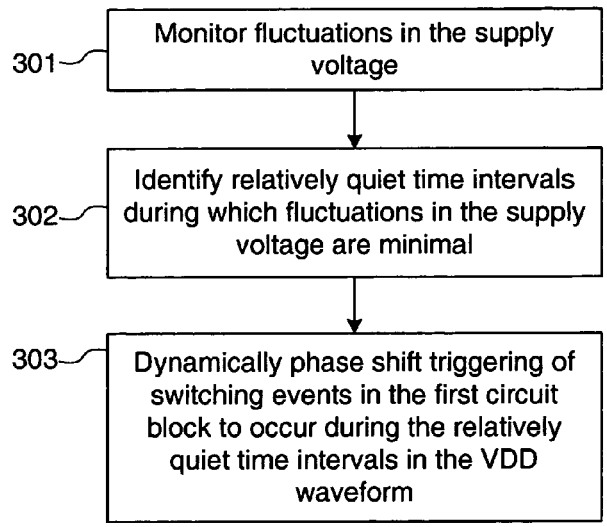
FIG. 3 is a flow diagram illustrative of an exemplary operation of one embodiment of the device of FIG. 1.

For example, referring also to the exemplary flow chart of FIG. 3, control circuit 130 monitors supply line 103 for fluctuations in VDD (step 301), and in response thereto identifies a relatively quiet time interval during which fluctuations in VDD are minimal (step 302). For some embodiments, control circuit 130 may generate a control signal (not shown for simplicity) indicative of the relatively quiet time intervals. Then, control circuit 130 dynamically phase-shifts the triggering of switching events in first circuit block 110 so as to occur during the relatively quiet time intervals of the VDD waveform (step 303). For example, control circuit 130 may dynamically phase-shift CLK1 to generate a waveform for CLK1D having triggering (e.g., rising) edges that occur during the relatively quiet time intervals. In this manner, CLK1D may be used to trigger switching events in first circuit block 110 during the relatively quiet time intervals of the VDD waveform to reduce clock jitter associated with first circuit block 110.

Note that although the exemplary timing diagram of FIG. 2B depicts the rising edge of CLK1D as occurring shortly after time t2, actual of embodiments of control circuit 130 may assert the rising edge of CLK1D at any suitable instance within the relatively quiet time interval of the VDD waveform. For some embodiments, control circuit 130 may assert the rising edges of CLK1D at some selected instance during the identified relatively quiet time interval, for example, at a predetermined time after the beginning of the relatively quiet time interval. For one embodiment, the predetermined time may be a delay value stored in a suitable memory element (not shown for simplicity) within and/or coupled to control circuit 130. For another embodiment, the predetermined time may be selected from one of a plurality of delay values stored in a memory element such as, for example, a look-up table (not shown for simplicity). For another embodiment, the predetermined time may be provided to the control circuit by a user via an input pin (not shown for simplicity) of the device.

For other embodiments, control circuit 130 may be configured to calculate the predetermined time as a function of the duration of the relatively quiet time interval, for example, so that switching events in first circuit block 110 are triggered at some relative instance (e.g., the midpoint) during the relatively quiet time interval. For such embodiments, the predetermined time may be calculated using hardware, software, or a combination of both. Of course, other suitable techniques not specifically described herein may be employed to determine the precise instance during the relatively quiet intervals at which the rising edges of CLK1D are asserted to trigger switching events in first circuit block 110.

As described above, control circuit 130 continuously monitors VDD via supply line 103, and in response thereto dynamically phase-shifts CLK1 so that CLK1D triggers switching events in first circuit block 110 during the relatively quiet time intervals of the VDD waveform. In this manner, embodiments of the present invention are able to reduce clock jitter associated with first circuit block 110 resulting from various sources of noise in the VDD waveform (e.g., from sources other than switching events in second circuit block 120). In addition, the dynamic nature of control circuit 130 allows embodiments of the present invention to reduce clock jitter associated with first circuit block 110 in applications for which the temporal relationship between switching events in first circuit 110 and switching events in second circuit block 120 is unknown and/or unpredictable. For example, embodiments of the present invention are particularly applicable to user-configurable devices such as PLDs for which the temporal relationship between switching events in first circuit block 110 and second circuit block 120 may not be known until the device is configured by the user to implement a specific design.

Figure 4A:
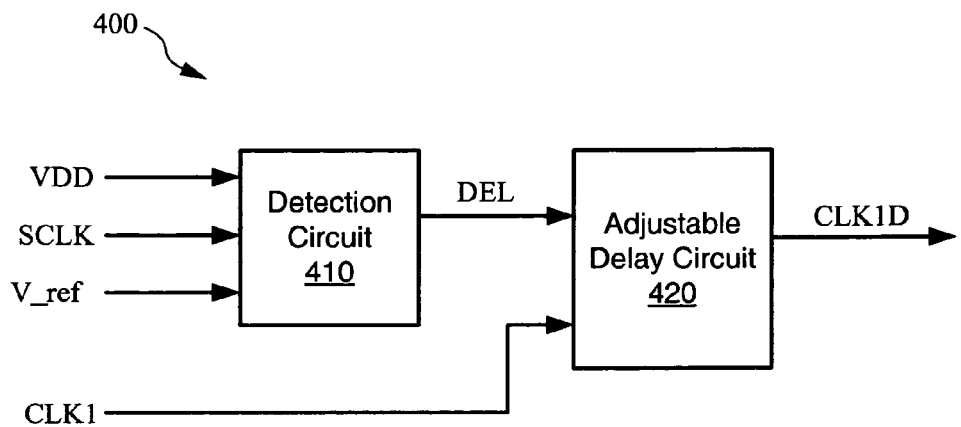
FIG. 4A is a block diagram of one embodiment of the control circuit of FIG. 1.

FIG. 4A shows a control circuit 400 that is one embodiment of control circuit 130 of FIG. 1. Control circuit 400 includes a detection circuit 410 and an adjustable delay circuit 420. Detection circuit 410 includes inputs to receive VDD, SCLK, and V_ref, and an output to generate a delay signal DEL. Adjustable delay circuit 420 includes a first input coupled to the output of detection circuit 410, a second input to receive CLK1, and an output to generate CLK1D. Detection circuit 410 monitors VDD to identify the relatively quiet time intervals in the VDD waveform, and in response thereto generates a value of DEL indicative of the phase relationship between rising edges of CLK1 and selected instances in the relatively quiet time intervals identified in the VDD waveform. Adjustable delay circuit 420, which may utilize well-known circuitry, dynamically phase-shifts CLK1 in response to DEL to generate a waveform for CLK1D that triggers switching events in first circuit block 110 during the relatively quiet time intervals.

Figure 4B:
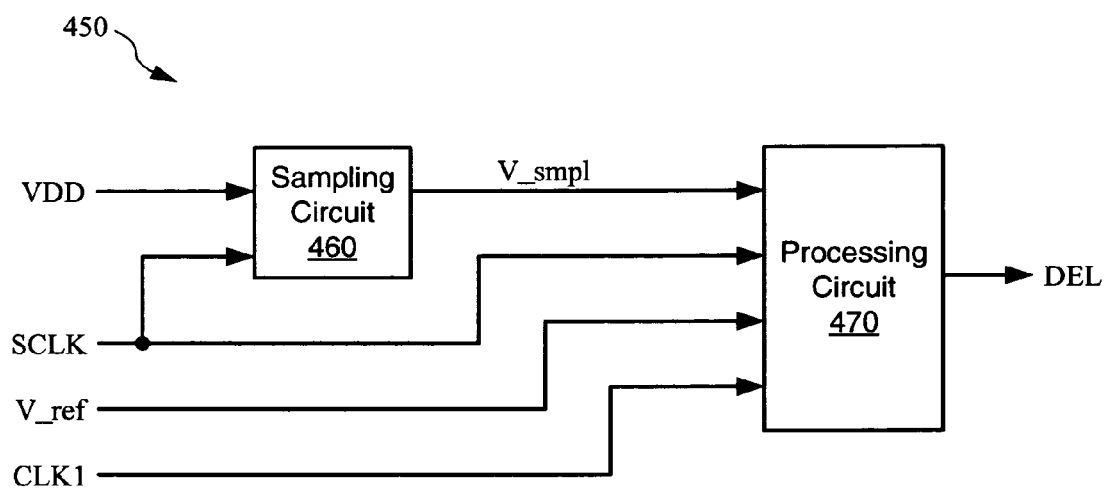
FIG. 4B is a block diagram of one embodiment of the detection circuit of FIG. 4A.

FIG. 4B shows a detection circuit 450 that is one embodiment of detection circuit 410 of FIG. 4A. Detection circuit 450 includes a sampling circuit 460 and a processing circuit 470. Sampling circuit 460 includes a first input to receive VDD, a second input to receive a sampling clock SCLK, and an output coupled to a first input of processing circuit 470. Processing circuit 470 includes a second input to receive SCLK, a third input to receive a reference voltage V_ref, a fourth input to receive CLK1, and an output to generate the delay signal DEL. The reference voltage V_ref, which may be generated in a well-known manner, may be any suitable voltage value.

Sampling circuit 460 may be any well-known circuit that periodically samples VDD on triggering (e.g., rising) edges of SCLK to generate a plurality of corresponding voltage samples (V_smpl) representative of the VDD waveform. For some embodiments, sampling circuit 460 may be a well-known analog-to-digital converter (ADC) that generates a digital signal indicative of the absolute value of a corresponding VDD sample. SCLK may be any suitable clock signal for sampling the voltage on supply line 103. For some embodiments, the master clock signal MCLK of FIG. 1 may be used as SCLK. For other embodiments, SCLK may be derived from MCLK, for example, using a well-known clock divider or clock multiplier circuit. For still other embodiments, SCLK may be generated independently of MCLK.

Processing circuit 470, which may be of a well-known architecture, receives the plurality of VDD samples V_smpl, and compares the absolute values of V_smpl with V_ref to identify the relatively quiet time intervals of the VDD waveform. Processing circuit 470 then generates a value of DEL indicative of the phase delay between a rising edge of CLK1 and a selected instance in a corresponding relatively quiet time interval.

Figure 5A:
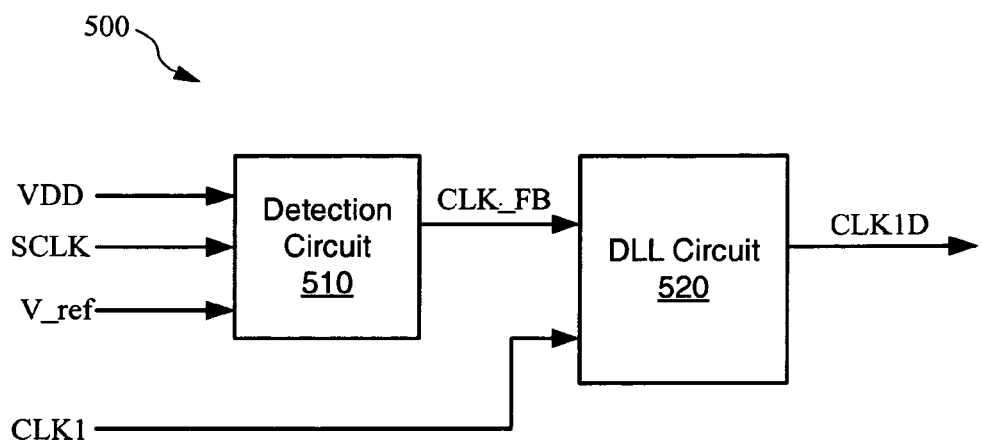
FIG. 5A is a block diagram of another embodiment of the control circuit of FIG. 1.

FIG. 5A shows a control circuit 500 that is another embodiment of control circuit 130 of FIG. 1. Control circuit 500 includes a detection circuit 510 and a delay-locked loop (DLL) circuit 520. Detection circuit 510 includes inputs to receive VDD, SCLK, and V_ref, and an output to generate a feedback clock signal CLK_FB. DLL circuit 520 includes a first input coupled to the output of detection circuit 510, a second input to receive CLK1, and an output to generate CLK1D. Detection circuit 510 monitors VDD to identify the relatively quiet time intervals in the VDD waveform, and in response thereto generates a waveform for CLK_FB having rising edges that occur at selected instances of corresponding relatively quiet time intervals of the VDD waveform. DLL circuit 520, which is well-known, phase-shifts CLK1 until CLK1D is in-phase with CLK_FB, and thereafter maintains a constant phase relationship between CLK1D and CLK_FB so that switching events in first circuit block 110 are triggered at times when fluctuations in VDD are at a minimum (e.g., zero).

For other embodiments, DLL circuit 520 may be a well-known phase locked-loop (PLL) circuit, or any other suitable circuit that phase-shifts CLK1 until CLK1D is in-phase with CLK_FB.

Figure 5B:
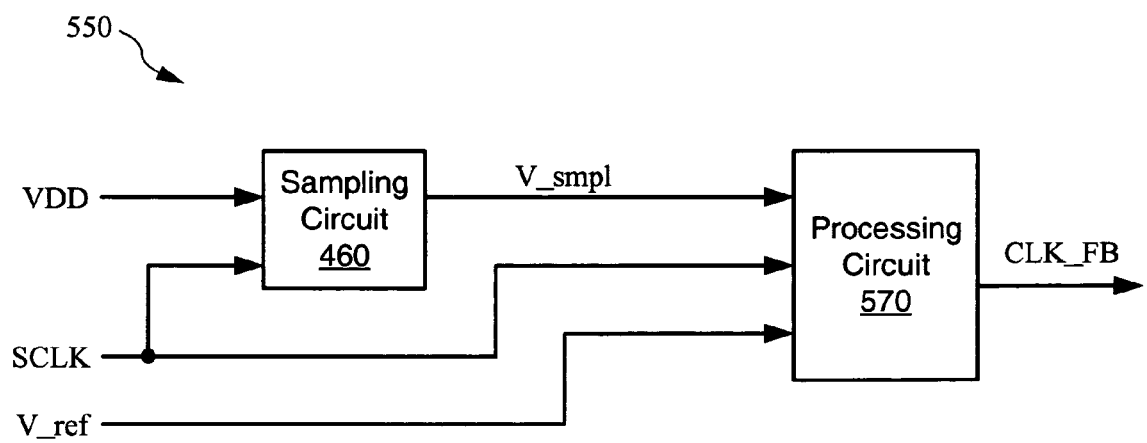
FIG. 5B is a block diagram of one embodiment of the detection circuit of FIG. 5A.

FIG. 5B shows a detection circuit 550 that is one embodiment of detection circuit 510 of FIG. 5A. Detection circuit 550 includes sampling circuit 460 and a processing circuit 570. Sampling circuit 460 operates in a manner similar to that described above with respect to FIG. 4B, and thus a detailed description of its operation is not repeated again for simplicity. Processing circuit 570 includes a first input to receive the VDD samples V_smpl from sampling circuit 460, a second input to receive SCLK, a third input to receive V_ref, and an output to generate CLK_FB.

Processing circuit 570, which may be of a well-known architecture, receives a plurality of VDD samples V_smpl, and compares the absolute values of V_smpl with V_ref to identify the relatively quiet time intervals of the VDD waveform. Processing circuit 570 then generates a waveform for CLK_FB having rising edges that occur at selected instances during corresponding relatively quiet time intervals of the VDD waveform.

Figure 6:
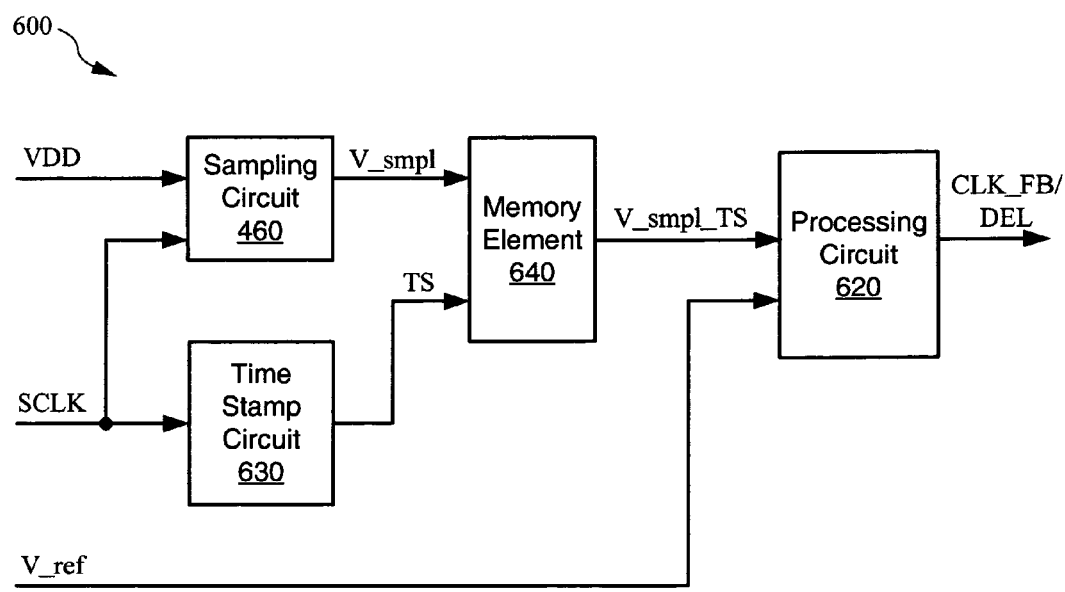
FIG. 6 is a block diagram of yet another embodiment of the detection circuits of FIGS. 4A and 4B.

For some embodiments, the detection circuits 450 of FIGS. 4B and 550 of FIG. 5B may also include a time stamp circuit and a memory device, for example, as illustrated in FIG. 6. Detection circuit 600, which operates in a manner similar to detection circuits 450 and 550, includes sampling circuit 460, a processing circuit 620, a time stamp circuit 630, and a memory element 640. Sampling circuit 460 has inputs to receive VDD and SCLK, and an output to generate V_smpl. Time stamp circuit 630 has an input to receive SCLK, and an output to generate a time stamp signal TS. Memory element 640 has a first input to receive V_smpl from sampling circuit 460, a second input to receive TS from time stamp circuit 630, and an output coupled to processing circuit 620, which for purposes of discussion herein may represent processing circuit 470 of FIG. 4B or processing circuit 570 of FIG. 5B. For other embodiments, time stamp circuit 630 and memory element 640 may be included within processing circuit 620.

Time stamp circuit 630 may be any suitable circuit that generates a time stamp (TS) indicative of the relative time between successive rising edges of SCLK. For some embodiments, time stamp circuit 630 may be a binary counter that increments a count value in response to each rising edge of SCLK, although other circuits may be used. Memory element 640, which may be any suitable memory such as, for example, DRAM, SRAM, PROM, EPROM, EEPROM, flash memory, registers, and the like, includes a plurality of storage locations each for storing a VDD sample V_smpl and its corresponding time stamp TS. In this manner, the time stamps TS may be used to determine the relative time between successive VDD samples generated by sampling circuit 460. Memory element 640 provides corresponding pairs of V_smpl and TS to processing circuit 620, which in response thereto identifies the relatively quiet time intervals of the VDD waveform.

Embodiments of the present invention may employ any suitable technique to identify the relatively quiet time intervals in the VDD waveform. For some embodiments, the absolute values of a selected number of the VDD samples are compared with V_ref to determine whether the corresponding sampling time period qualifies as a relatively quiet time interval of the VDD waveform.

Figure 7:
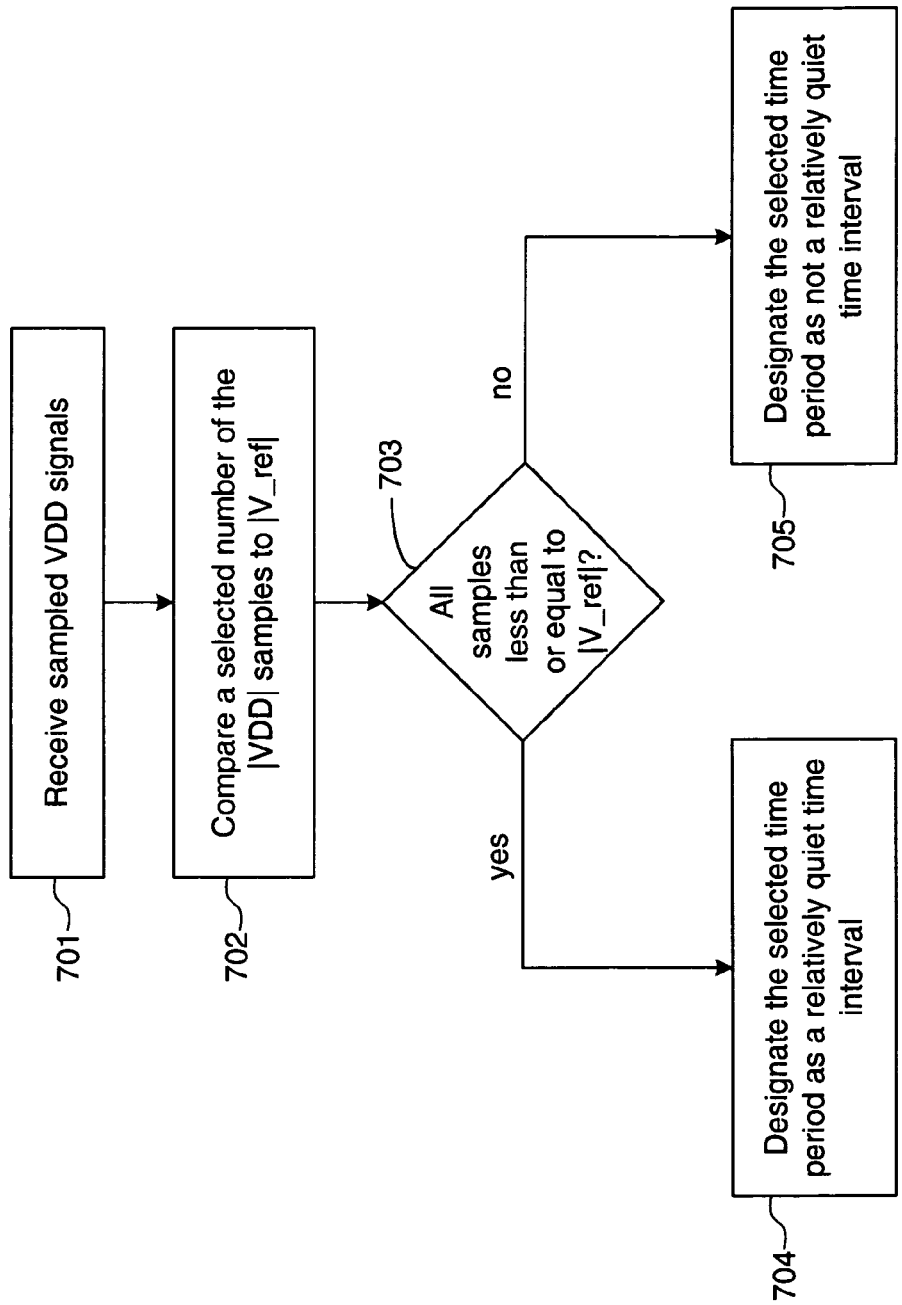
FIG. 7 is a flow diagram depicting an exemplary operation of some embodiments for identifying a relatively quiet time interval of the supply voltage waveform associated with the device of FIG. 1.

For example, FIG. 7 illustrates an exemplary operation for identifying relatively quiet time intervals in the VDD waveform. First, the VDD samples generated by the sampling circuit are provided to the processing circuit (step 701). The processing circuit compares the absolute values of a selected number of VDD samples to the reference voltage |V_ref| (step 702). Because the supply voltage is sampled using SCLK, the selected number of VDD samples corresponds to a time period defined by SCLK. Then, if the absolute value of each of the selected VDD samples is less than or equal to the absolute value of V_ref (i.e., |V_ref|), as tested in step 703, the corresponding time period is designated as a relatively quiet time interval (step 704). Otherwise, if the absolute value of one or more of the VDD samples is greater than |V_ref|, as tested in step 703, the corresponding time period is not designated as a relatively quiet time interval (step 705).

Embodiments of the present invention may also be configured to identify relatively noisy time intervals of the VDD waveform during which fluctuations in VDD are relatively large. For such embodiments, the processing circuits described above may employ any suitable technique to identify the noisy time intervals of the VDD waveform. For some embodiments, the processing circuits may be configured to define a noisy time interval as any time interval that has not been previously designated as a relatively quiet time interval. For other embodiments, the processing circuits may be configured to identify a noisy time interval independently of the quiet time intervals.

For example, FIG. 8 illustrates one exemplary operation for identifying the relatively noisy time intervals of the VDD waveform. Initially, a first of the VDD samples is provided to the processing circuit (step 801). Then, the absolute value of the VDD sample is compared to |V_ref| (step 802). Then, if the absolute value of the VDD voltage sample is greater than |V_ref|, as tested in step 803, the processing circuit receives the next VDD sample (step 804), compares its absolute value to |V_ref| (step 802), and determines whether it is greater than |V_ref| (step 803). This process is repeated until the absolute value of a VDD sample is not greater than |V_ref|, after which the processing circuit calculates the time period during which a number of successive VDD samples are greater than |V_ref| (step 805). The time period may be calculated using SCLK, the time stamps TS, and/or by the number of successive VDD samples greater than V_ref. Then, the processing circuit designates the time period calculated in step 805 as a relatively noisy time interval of the VDD waveform (step 806). Thereafter, the processing circuit may be configured to ensure that switching events in first circuit block 110 are not triggered during the relatively noisy time intervals.

For another embodiment, the processing circuits may be configured to define a noisy time interval as any time period during which only one of the VDD samples has an absolute value that is less than or equal to V_ref. For yet another embodiment, the processing circuits may be configured to define a noisy time interval as including less than a predetermined number of VDD voltage samples having an absolute value less than or equal to a V_ref.

As described above, embodiments of the present invention may be employed to reduce clock jitter associated with first circuit block 110 by dynamically phase-shifting the triggering of switching events in first circuit block 110 in response to fluctuations in VDD so that the switching events in first circuit block 110 occur during relatively quiet time intervals of the VDD waveform. For some applications in which embodiments of the present invention may be employed, a significant portion of the supply voltage noise that causes clock jitter in first circuit block 110 may result from switching events in second circuit block 120. Thus, for some embodiments, control circuit 130 of FIG. 1 may, after identifying the relatively quiet time intervals of the VDD waveform, be configured to maintain a suitable phase relationship between CLK1D and CLK2 that causes the triggering of switching events in first circuit block 110 to occur during the relatively quiet time intervals of the VDD waveform identified by control circuit 130.

Further, as discussed above, the dynamic nature of control circuit 130 allows embodiments of the present invention to effectively reduce clock jitter in user-configurable devices such as PLDs. Because of the programmable nature of PLDs, the functions performed by various embodiments of control circuit 130 described above may be implemented in a PLD using its existing resources, thereby allowing embodiments of the present invention to be implemented within the PLD without having to modify its architecture, e.g., without having to include additional dedicated circuitry to implement the functions performed by control circuit 130. In this manner, PLDs already employed in user systems may be re-configured to implement various embodiments of the present invention.

While particular embodiments of the present invention have been shown and described, it will be obvious to those skilled in the art that changes and modifications may be made without departing from this invention in its broader aspects, and therefore, the appended claims are to encompass within their scope all such changes and modifications as fall within the true spirit and scope of this invention.

What is claimed is:

1. An integrated circuit (IC) device, comprising:
a power distribution system to distribute a supply voltage for powering circuits of the IC device;
a first circuit block including one or more circuit elements clocked by a first clock signal and coupled to the power distribution system to receive the supply voltage; and
a control circuit having an input coupled to receive the supply voltage from the power distribution system and configured to sample the supply voltage and compare the supply voltage with a reference voltage to identify first time intervals corresponding to fluctuations in the supply voltage which are less than the reference voltage, and further configured to dynamically phase-shift the first clock signal to trigger all switching events in the first circuit block during the first time intervals.

2. The device of claim 1, wherein the control circuit is further configured to identify second time intervals corresponding to fluctuations in the supply voltage which are relatively large with respect to the first time intervals.

3. The device of claim 1, further comprising:
a second circuit block including one or more circuit elements clocked by a second clock signal, wherein the supply voltage fluctuations are caused by switching events in the second circuit block.

4. The device of claim 3, wherein the control circuit is configured to maintain a desired phase relationship between the phase-shifted first clock signal and the second clock signal in response to the identified first time intervals.

5. The device of claim 1, wherein the control circuit comprises:
a detection circuit having an input to receive the supply voltage and having an output to generate a delay signal; and
an adjustable delay circuit having a first input to receive the delay signal, a second input to receive the first clock signal, and an output to generate the phase-shifted first clock signal in response to the delay signal.

6. The device of claim 5, wherein the delay signal comprises a phase delay between a triggering edge of the first clock signal and a selected instance in the first time interval, and wherein the selected instance indicates when the supply voltage fluctuations are at a minimum.

7. The device of claim 5, wherein the detection circuit comprises:
  a sampling circuit having a first input to receive the supply voltage, a second input to receive a sampling clock signal, and an output; and
  a processing circuit having a first input coupled to the output of the sampling circuit, a second input to receive a reference voltage, a third input to receive the first clock signal, and an output to generate the delay signal.

8. The device of claim 7, wherein:
  the sampling circuit is configured to generate a plurality of voltage samples indicative of the supply voltage's waveform; and
  the processing circuit is configured to compare the voltage samples with the reference voltage to generate a value of the delay signal indicative of a phase delay between a triggering edge of the first clock signal and a selected instance in one of the first time intervals during which the supply voltage fluctuations are minimal.

9. The device of claim 7, wherein the detection circuit further comprises:
  a time stamp circuit having an input to receive the sampling clock signal; and
  a memory element having a first input coupled to the output of the sampling circuit, a second input coupled to an output of the time stamp circuit, and an output coupled to the first input of the processing circuit.

10. The device of claim 1, wherein the control circuit comprises:
  a detection circuit having an input to receive the supply voltage and having an output to generate a feedback clock signal; and
  a delay-locked loop (DLL) circuit having a first input to receive the feedback clock signal, a second input to receive the first clock signal, and an output to generate the phase-shifted first clock signal in response to the feedback clock signal.

11. The device of claim 10, wherein the phase-shifted first clock signal triggers a switching event in the first circuit block during one of the first time intervals, wherein each of a plurality of selected edges of the feedback clock signal occurs at a selected instance in a corresponding first time interval, and wherein the selected instance indicates when the supply voltage fluctuations are at a minimum.

12. The device of claim 10, wherein the detection circuit comprises:
  a sampling circuit having a first input to receive the supply voltage, a second input to receive a sampling clock signal, and an output; and
  a processing circuit having a first input coupled to the output of the sampling circuit, a second input to receive a reference voltage, and an output to generate the feedback clock signal.

13. The device of claim 12, wherein:
  the sampling circuit is configured to generate a plurality of voltage samples indicative of the supply voltage's waveform; and
  the processing circuit is configured to compare the voltage samples with the reference voltage to generate the reference clock signal as having selected edges that occur during first time intervals during which supply voltage fluctuations are minimal.

14. The device of claim 12, wherein the detection circuit further comprises:
  a time stamp circuit having an input to receive the sampling clock signal; and
  a memory element having a first input coupled to the output of the sampling circuit, a second input coupled to an output of the time stamp circuit, and an output coupled to the first input of the processing circuit.

15. A control circuit for minimizing clock jitter in a first circuit block of an integrated circuit device caused by fluctuations in a supply voltage from a power supply of the device for powering circuits of the device, comprising:
  means for sampling the supply voltage to identify a first time interval corresponding to fluctuations in the supply voltage which are less than a reference voltage; and
  means for dynamically delaying a triggering of switching events in the first circuit block so that all the switching events in the first circuit block occur during the first time interval, wherein the means for sampling comprises:
  means for generating a plurality of voltage samples indicative of the supply voltage fluctuations;
  means for comparing the voltage samples with the reference voltage; and
  means for determining whether a selected number of the voltage samples are less than the reference voltage.

16. A method for minimizing clock jitter in a circuit block of an integrated circuit device caused by fluctuations in a supply voltage from a power supply of the device for powering circuits of the device, the method comprising:
  identifying a first time interval corresponding to fluctuations in the supply voltage which are less than a reference voltage, wherein the identifying comprises:
    sampling the supply voltage to generate a plurality of voltage samples indicative of the supply voltage fluctuations;
    comparing the voltage samples with the reference voltage; and
    determining whether a selected number of the voltage samples are less than the reference voltage; and
  dynamically delaying a triggering of switching events in the circuit block so that all the switching events occur during the first time interval.

17. The device of claim 1, wherein the supply voltage fluctuations are approximately zero during the first time intervals.

18. The device of claim 3, wherein the phase-shifted first clock signal triggers the switching events in the first circuit block at different times than the second clock signal triggers switching events in the second circuit block.

19. The control circuit of claim 15, wherein the supply voltage fluctuations are caused by switching events in a second circuit block of the device.

* * * * *